United States Patent
Kimura et al.

(10) Patent No.: US 10,451,866 B2
(45) Date of Patent: Oct. 22, 2019

(54) SCANNING TYPE IMAGE MEASURING APPARATUS AND SCANNING TYPE IMAGE MEASURING METHOD

(71) Applicant: Hitachi-LG Data Storage, Inc., Tokyo (JP)

(72) Inventors: Katsuhiko Kimura, Tokyo (JP); Daisuke Tomita, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 163 days.

(21) Appl. No.: 15/725,405

(22) Filed: Oct. 5, 2017

(65) Prior Publication Data

US 2018/0120558 A1 May 3, 2018

(30) Foreign Application Priority Data

Oct. 28, 2016 (JP) ................... 2016-211201

(51) Int. Cl.
  *G01J 1/04* (2006.01)
  *G02B 26/10* (2006.01)
  *G02B 26/08* (2006.01)

(52) U.S. Cl.
  CPC .......... *G02B 26/101* (2013.01); *G01J 1/0403* (2013.01); *G02B 26/0875* (2013.01)

(58) Field of Classification Search
  CPC ....... G11B 7/0932; G11B 7/093; G01J 1/0403
  See application file for complete search history.

(56) References Cited

U.S. PATENT DOCUMENTS

| 2003/0090816 A1* | 5/2003 | Nakamura | ........... G11B 7/0933 359/814 |
| 2008/0019025 A1* | 1/2008 | Murakami | ........... G11B 7/0932 359/813 |
| 2014/0204388 A1 | 7/2014 | Osawa et al. | |

FOREIGN PATENT DOCUMENTS

JP  2014-160057 A  9/2014

* cited by examiner

*Primary Examiner* — Thanh Luu
(74) *Attorney, Agent, or Firm* — Mattingly & Malur, PC

(57) ABSTRACT

Provided is a scanning type image measuring apparatus capable of reducing an imaging time while suppressing an increase in power consumption. The scanning type image measuring apparatus includes an objective lens scanning mechanism for operating an objective lens in a first direction and a second direction perpendicular to the first direction, wherein, with respect to a resonance frequency related to a spring constant of a support member supporting a movable unit including the objective lens and a mass of the movable unit, the resonance frequency in the second direction is set to be higher than the resonance frequency in the first direction, and a scanning frequency of the objective lens in the second direction is set to be higher than the resonance frequency in the second direction.

16 Claims, 10 Drawing Sheets

SCANNING TYPE IMAGE MEASURING APPARATUS AND SCANNING TYPE IMAGE MEASURING METHOD

CLAIM OF PRIORITY

The present application claims priority from Japanese patent application serial No. JP 2016-211201, filed on Oct. 28, 2016, the content of which is hereby incorporated by reference into this application.

BACKGROUND OF THE INVENTION

(1) Field of the Invention

The present invention relates to a scanning type image measuring apparatus and a scanning type image measuring method, and particularly, to a scanning type image measuring apparatus and a scanning type image measuring method suitable for measuring a tomographic image of a living body or the like by scanning light.

(2) Description of the Related Art

There is known an optical measuring apparatus that acquires an image reflecting a surface structure and an internal structure of a measurement target by using light. In the apparatus, a light beam emitted from a light source is used as a light flux, the light flux is condensed and irradiated on the measurement target by the lens, a signal light beam reflected or scattered by the measurement target is detected, and a detection signal is processed, so that measurement is performed. At the time of the measurement, an image is measured by scanning a condensing position of a light flux by a lens in a z-axis direction (a direction of an axis of the lens) and an x direction (a direction perpendicular to the axis of the lens) by using a scanning unit.

By controlling a lens actuator constituting the scanning unit to repeatedly scan the lens in the z direction and to move the lens by a predetermined amount in the x direction each time the lens reaches a return position, a two-dimensional image of the measurement target is obtained. Such a technique is disclosed in, for example, JP 2014-160057 A.

SUMMARY OF THE INVENTION

The above-described related art discloses an optical measuring apparatus of acquiring an image of a measurement target by scanning an objective lens in two directions. By using the lens actuator that scans the objective lens, there is no need to use a wavelength scanning type light source or a spectroscope, so that it is possible to provide a compact and inexpensive apparatus. However, since the objective lens is mechanically scanned, there is a problem in that an imaging time for acquiring the image of the measurement target increases.

In order to reduce the imaging time, it is effective to increase the scanning frequency of the objective lens. However, only by increasing the driving frequency, the scanning amplitude for a certain driving voltage becomes small. In this case, in order to obtain a predetermined scanning amplitude, it is necessary to increase the driving voltage, which causes a problem of an increase in power consumption.

In addition, in a mechanism for scanning in two directions, generally, scanning in one direction is performed at a high speed, and scanning in the other direction is performed at a low speed. In order to obtain the effect of increasing the scanning amplitude in the scanning direction at high speed, it is considered to allow the resonance frequency and the scanning frequency to be close to each other. However, if the resonance frequency is increased in both of the two directions, the displacement in the direction to operate at a low speed becomes small, and in this case, there is a problem in that the power consumption at the time of low speed operation may increase.

The invention is to provide a scanning type image measuring apparatus and a scanning type image measuring method capable of reducing an imaging time while suppressing an increase in power consumption.

According to an aspect of the invention, there is provided a technique where an objective lens and a support member displaceably supporting the objective lens is provided, and image measurement is performed by irradiating a measurement target with light while scanning the objective lens at a predetermined scanning frequency, wherein the objective lens is scanned in a first direction and a second direction substantially perpendicular to the first direction, wherein a resonance frequency is determined by a mass of a movable unit that can move including the objective lens and an elastic characteristic of the support member, and wherein a resonance frequency in the second direction is higher than a resonance frequency in the first direction, and a scanning frequency of the objective lens in the second direction is higher than the resonance frequency in the second direction.

Specifically, a scanning type image measuring apparatus is provided with an objective lens scanning mechanism for operating the objective lens in the first direction and the second direction perpendicular to the first direction, and with respect to the resonance frequency related to a spring constant of the support member supporting the movable unit including the objective lens and a mass of the movable unit, the resonance frequency in the second direction is higher than the resonance frequency in the first direction, and the scanning frequency of the objective lens in the second direction is higher than the resonance frequency in the second direction.

According to the invention, it is possible to suppress an increase in power consumption and reduce an imaging time due to an effect of increasing a scanning amplitude of an objective lens.

DETAILED DESCRIPTION OF THE EMBODIMENT

Hereinafter, embodiments of the invention will be described with reference to the drawings.

First Embodiment

Figure 1:
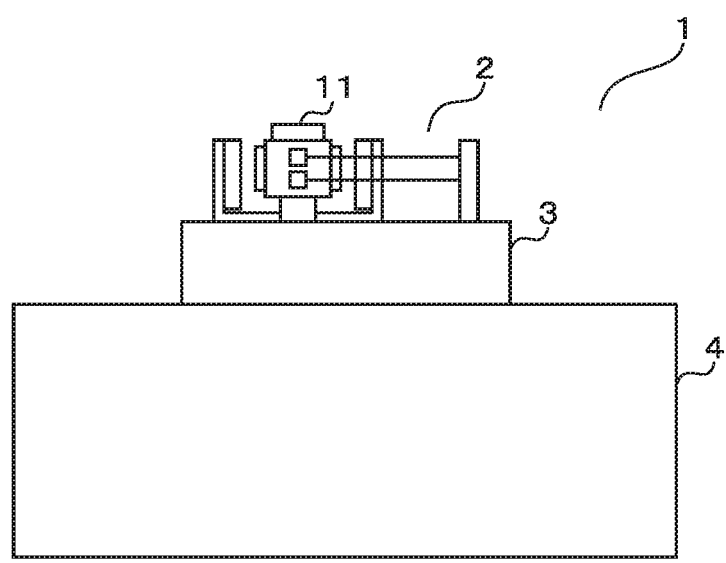
FIG. 1 is a diagram illustrating a scanning type image measuring apparatus according to a first embodiment of the invention.
Figure 1:
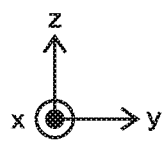

FIG. 1 is a diagram illustrating a scanning type image measuring apparatus 1 according to a first embodiment of the invention. The scanning type image measuring apparatus 1 is configured to include an objective lens scanning mechanism 2 for operating an objective lens 11 for focusing light on a measurement target, a movement mechanism 3 for moving the objective lens scanning mechanism 2, and a housing 4 on which an optical system is mounted. In the embodiment, an optical axis direction of the objective lens 11 is defined as a z direction, and two directions perpendicular to the z direction are set as an x direction and a y direction.

Figure 2:
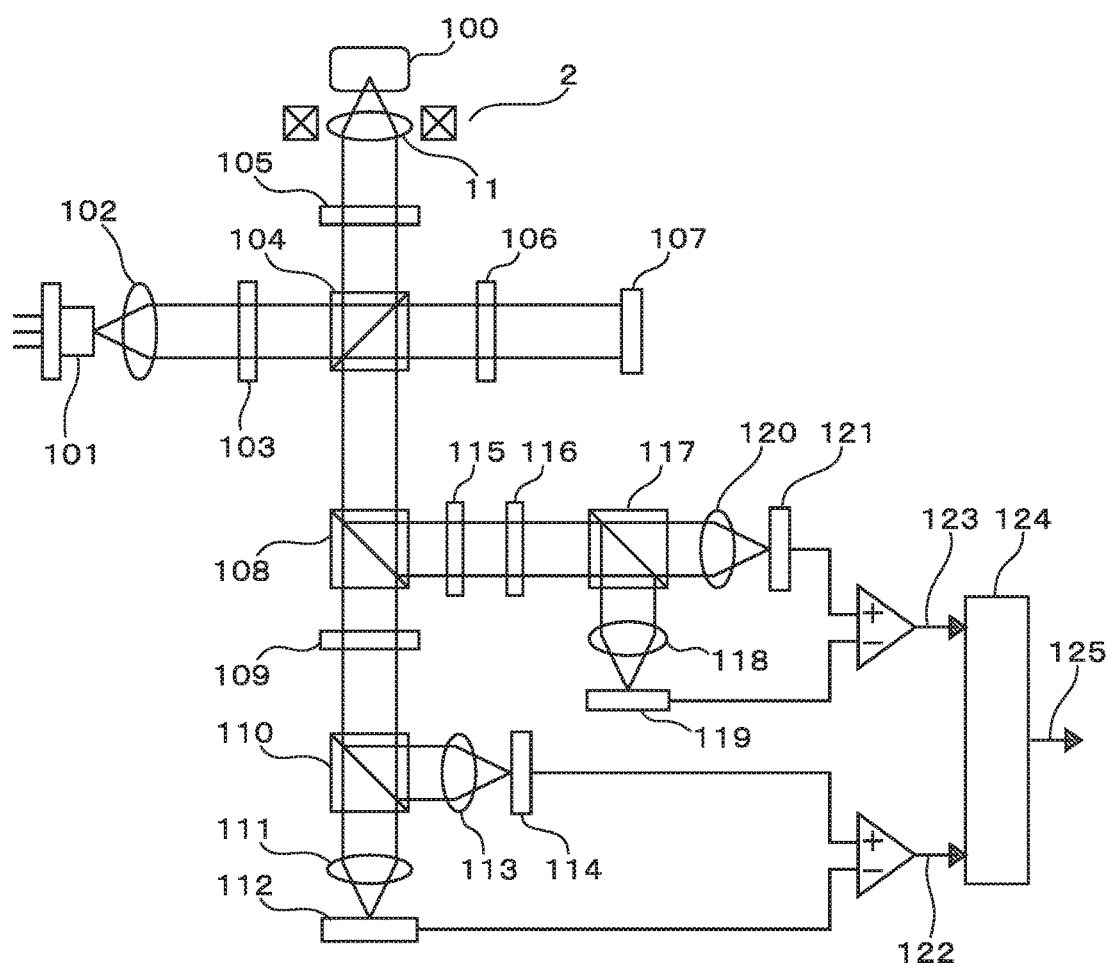
FIG. 2 is a diagram illustrating a configuration example of an optical system of a scanning type image measuring apparatus.

FIG. 2 is a diagram illustrating a configuration example of an optical system of the scanning type image measuring apparatus 1. A light beam emitted from a light source 101 is converted into a parallel light beam by a collimator lens 102, passes through a half-wave plate 103, and is split into a signal light beam and a reference light beam by a polarization beam splitter 104. The signal light beam reflected by the polarization beam splitter 104 passes through a quarter-wave plate 105, is condensed by the objective lens 11, and is irradiated onto a measurement target 100. The signal light beam reflected by the measurement target 100 again passes through the quarter-wave plate 105 to change the polarization direction thereof and passes through the polarization beam splitter 104. On the other hand, the reference light beam emitted from the light source 101 and passing through the polarization beam splitter 104 passes through a quarter-wave plate 106, is reflected by a fixed mirror 107, passes through the quarter-wave plate 106 again to change the polarization direction thereof, and is reflected by the polarization beam splitter 104.

The signal light beam and the reference light beam are multiplexed by the polarization beam splitter 104, and a combined light beam is split into two beams by a beam splitter 108. The combined light beam having passed through the beam splitter 108 passes through the half-wave plate 109 and is split into two beams by a polarization beam splitter 110. The two beams are condensed by condenser lenses 111 and 113 and are incident on the photodetectors 112 and 114. The combined light beam reflected by the beam splitter 108 passes through a quarter-wave plate 115 and a half-wave plate 116, is split into two beams by a polarization beam splitter 117, condensed by condenser lenses 118 and 120, and is incident on photodetectors 119 and 121.

A first detection signal 122 is obtained by differential detection between the output of the photodetector 112 and the output of the photodetector 114, and a second detection signal 123 is obtained by differential detection of the output of the photodetector 119 and the output of the photodetector 121. The first detection signal 122 and the second detection signal 123 are calculated by a signal processing unit 124, and an image signal 125 corresponding to the measurement target 100 is obtained.

Scanning of the signal light beam which is to be condensed on the measurement target 100 is performed in three directions of x, y, and z. Among these directions, in the z direction which is the optical axis direction of the objective lens 11 and in the x direction which is one direction perpendicular to the z direction, the position of the objective lens 11 is moved by the objective lens scanning mechanism 2. In the remaining y direction, the objective lens scanning mechanism 2 is moved by the movement mechanism 3 such as a direct-acting motor. Herein, the z direction is defined as the first direction, the x direction is defined as the second direction, and the y direction is defined as the third direction.

Figure 3:
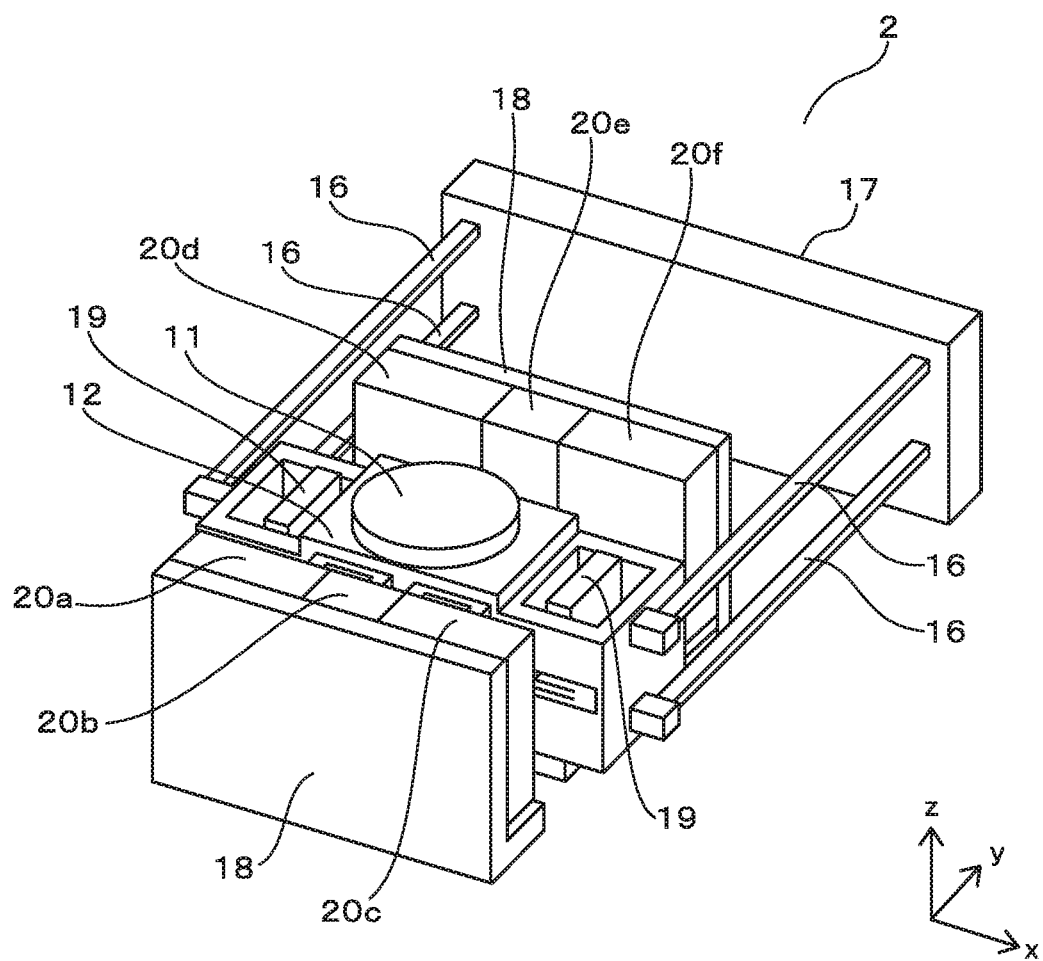
FIG. 3 is a diagram illustrating an objective lens scanning mechanism of a scanning type image measuring apparatus.
Figure 4:
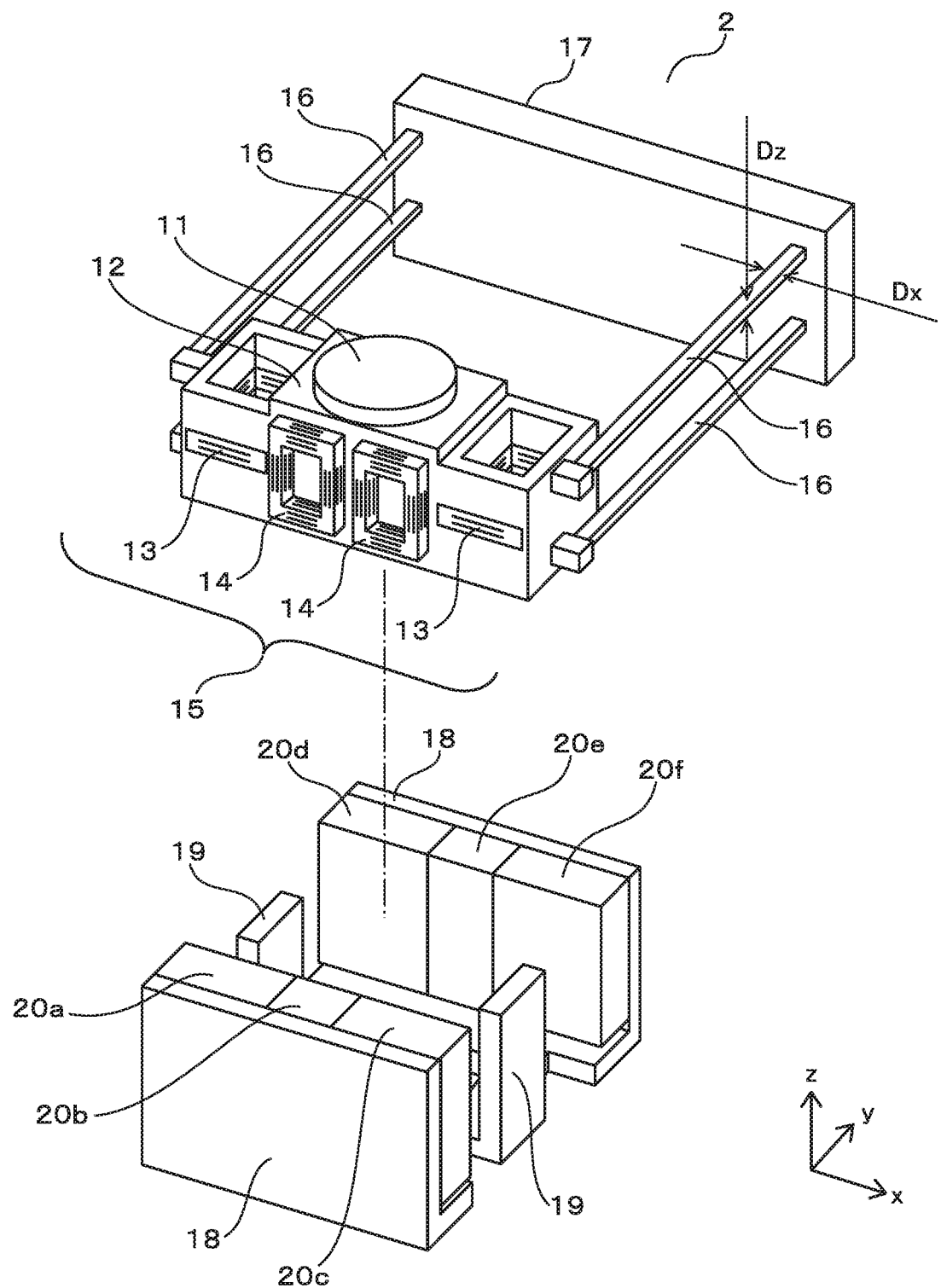
FIG. 4 is an exploded perspective diagram of an objective lens scanning mechanism of a scanning type image measuring apparatus.

FIG. 3 is a diagram illustrating a configuration example of the objective lens scanning mechanism 2, and FIG. 4 is an exploded perspective diagram thereof. The objective lens 11 is mounted on an upper surface of a holder 12. Two first coils 13 for generating a driving force in the first direction are attached to the holder 12. Two second coils 14 for generating a driving force in the second direction are attached to the two side surfaces of the holder 12, respectively. A movable unit 15 is configured with the objective lens 11, the holder 12, the first coil 13, and the second coil 14.

The movable unit 15 is supported with respect to a fixed unit 17 by a support member 16. The support member 16 is arranged by setting the third direction (y direction) as the longitudinal direction thereof. Therefore, the movable unit 15 can be displaced in the first direction and the second direction with respect to the fixed unit 17. The cross-sectional shape of the support member 16 being parallel to the zx plane is a rectangle of which a dimension (Dx) in the second direction is larger than a dimension (Dz) in the first direction. By doing so, the spring constant in the second direction with respect to the displacement of the movable unit 15 is larger than the spring constant in the first direction.

Magnets 20a to 20f for exerting a magnetic flux density on the first coil 13 and the second coil 14 are arranged to face the two side surfaces of the holder 12 to which the second coils 14 are attached. The magnets 20a to 20f are attached to a yoke 18 which is a magnetic body. An inner yoke 19 extending from the yoke 18 is arranged in a space inside the first coil 13. With respect to the magnets 20a to 20f arranged to face the two side surfaces of the holder 12, the three magnets 20a to 20c and 20d to 20f are adjacent to each other, respectively. The three magnets 20a to 20c and 20d to 20f are arranged so that different magnetic poles face sides of the second coil 14 parallel to the first direction (z direction).

In the objective lens scanning mechanism 2 configured as described above, when a current flows through the first coil 13, a driving force in the first direction is generated by electromagnetic action with the magnetic flux density from the magnets 20a, 20c, 20d, and 20f, so that the movable unit 15 moves in the first direction. In addition, when a current flows through the second coil 14, a driving force in the second direction is generated by electromagnetic action with the magnetic flux density from the magnets 20*a* to 20*f*, and the movable unit moves in the second direction. The movable unit 15 is supported by a support member 16 functioning as a beam. Therefore, the movable unit 15 is displaced in the first direction by the driving force generated by the current flowing through the first coil 13 according to the cross-sectional shape (specifically, the cross-sectional second moment, particularly, the dimension (Dz) in the first direction), length, and elastic modulus of the support member 16. Similarly, the movable unit 15 is displaced by the driving force generated by the current flowing through the second coil 14 according to the cross-sectional shape (particularly, the dimension (Dx) in the second direction), length, and elastic modulus of the support member 16.

In the embodiment, a constant determined according to the cross-sectional shape and length of the support member 16 is referred to as a spring constant. In addition, in the embodiment, a factor of the support member 16 affecting the displacement with respect to the driving force is referred to as an elastic characteristic.

In addition, in the movement mechanism 3, the objective lens scanning mechanism 2 (a member including the movable unit 15, the fixed unit 17, the yoke 18, the inner yoke 19, and the magnets 20*a* to 20*f*) is treated as an integral component, and thus, the objective lens scanning mechanism 2 is operated to be integrally displaceable. A specific configuration (external yokes, external magnets, and the like) of the movement mechanism 3 is, for example, a direct-acting motor or the like. In addition, in this case, the entire objective lens scanning mechanism 2 corresponds to the mass, and the resistance due to the frictional resistance or the like against the movement of the objective lens scanning mechanism 2 corresponds to the spring constant.

With respect to the image of the measurement target 100, the image in the zx plane is acquired by scanning the objective lens 11 at the scanning frequency fs1 in the first direction while scanning the objective lens 11 at the scanning frequency fs2 in the second direction. After that, by repeating the procedure of moving the objective lens scanning mechanism 2 by a predetermined amount in the third direction by the movement mechanism 3 and scanning the objective lens 11 by the objective lens scanning mechanism 2 to acquire the image in the next zx plane, a three-dimensional image of the measurement target 100 can be acquired.

In addition, in the above description, the scanning of the objective lens 11 in the first direction is illustrated as a continuous change at the scanning frequency fs1. However, there may be employed a method where, while scanning the objective lens 11 in one row in the second direction, the position in the first direction is be fixed, and after the scanning in one row in the second direction, the objective lens 11 is moved by a predetermined amount in the first direction.

In addition, in the above description, exemplified is the method of moving the objective lens scanning mechanism 2 by a predetermined amount in the third direction. However, there may be employed a method of continuously moving the objective lens scanning mechanism 2 in the third direction at the scanning frequency fs3.

In addition, in the above description, there is exemplified the method of acquiring the image in the zx plane by the scanning of the objective lens 11 and, after that, moving the objective lens scanning mechanism 2 in the third direction. However, there may be employed a method of acquiring a three-dimensional image, while scanning the objective lens 11 at the scanning frequency fs2 in the second direction, moving the objective lens scanning mechanism 2 in the third direction to acquire the image in the xy plane, and after that, moving the objective lens 11 in the first direction by the objective lens scanning mechanism 2.

In any case, the scanning of the objective lens 11 in the second direction is performed at a higher speed than the scanning or moving of the objective lens 11 in the first direction and the third direction. In the first direction and the third direction, the objective lens 11 may be scanned at a low speed or may be statically moved by a predetermined amount. Therefore, the imaging time for acquiring the image of the measurement target is determined by the scanning of the objective lens 11 in the second direction.

In order to reduce the imaging time, it is effective to increase the scanning frequency of the objective lens 11 in the second direction. However, in the frequency response characteristic of the objective lens scanning mechanism 2, the scanning amplitude decreases as the frequency increases in the high frequency range higher than the resonance frequency related to the spring constant of the support member 16 and the mass of the movable unit 15, since the scanning frequency merely increases in the case where the resonance frequency is constant, the same scanning amplitude is obtained, and thus, it is necessary to apply a larger current or voltage. This leads to an increase in power consumption.

Herein, the resonance frequency is uniquely determined according to the mass of the movable unit 15, the cross-sectional shape (specifically, the cross-sectional second moment), length, and elastic modulus of the support member 16. The resonance frequency may be obtained by solving equations of a beam, and the resonance frequency may also be obtained by experimenting an actual machine.

In order to increase the scanning amplitude with respect to a constant current or voltage, considered is that the resonance frequency related to the spring constant of the support member 16 and the mass of the movable unit 15 is close to the scanning frequency, and the effect of increasing the amplitude near the resonance frequency is used. However, in the objective lens scanning mechanism 2, there are two operation directions of the first direction and the second direction, increasing the resonance frequency in both of the two directions causes the spring constant for the displacement in the first direction to increase at low speed scanning or static movement by a predetermined amount, which leads to an increase in power consumption during operation in the first direction.

Figure 5A:
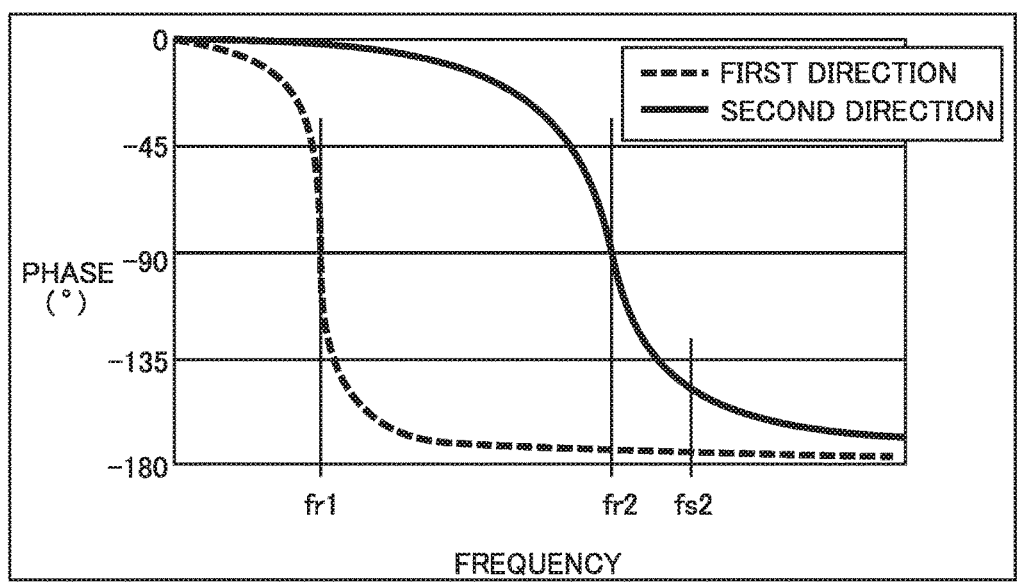
FIGS. 5A and 5B are diagrams illustrating a frequency response characteristic of an objective lens scanning mechanism of a scanning type image measuring apparatus.
Figure 5B:
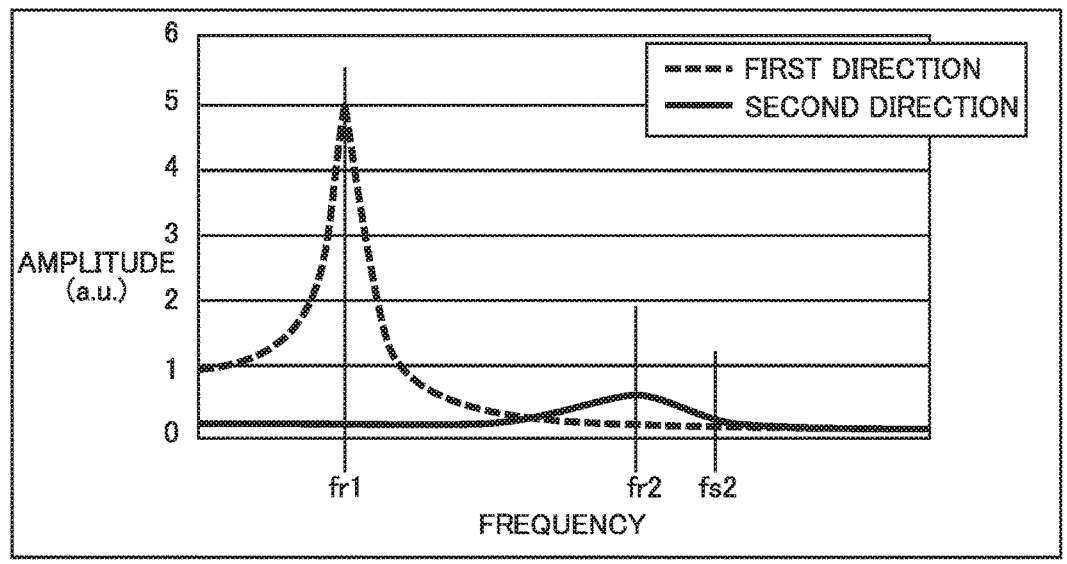

FIGS. 5A and 5B are diagrams illustrating an example of the frequency response characteristic of the objective lens scanning mechanism 2 according to the embodiment. FIG. 5A illustrates the frequency response characteristic of the phase, and FIG. 5B illustrates the frequency response characteristic of the amplitude. The frequency response characteristics of the first direction and the second direction illustrate a response to a constant current or a constant voltage.

In the embodiment, by allowing the dimension in the second direction of the cross section parallel to the zx plane of the support member 16 to be larger than the dimension in the first direction, the spring constant of the support member 16 in the second direction can be set to be larger than the spring constant in the first direction. Therefore, the resonance frequency fr2 in the second direction can be allowed to be higher than the resonance frequency fr1 in the first direction. In FIGS. 5A and 5B, exemplified is a case where the resonance frequency fr2 in the second direction is three times the resonance frequency fr1 in the first direction and a damping ratio is 0.1.

In the embodiment, the resonance frequency fr2 in the second direction is set to be higher than the resonance frequency fr1 in the first direction, and after that, the scanning frequency fs2 of the objective lens 11 in the second direction is set to be higher than the frequency fr2 in the second direction. Therefore, it is possible to suppress the increase in power consumption with respect to the operation in the first direction and, after that, to increase the scanning amplitude in the second direction and reduce the scanning time, which will be described in the following.

Figure 6:
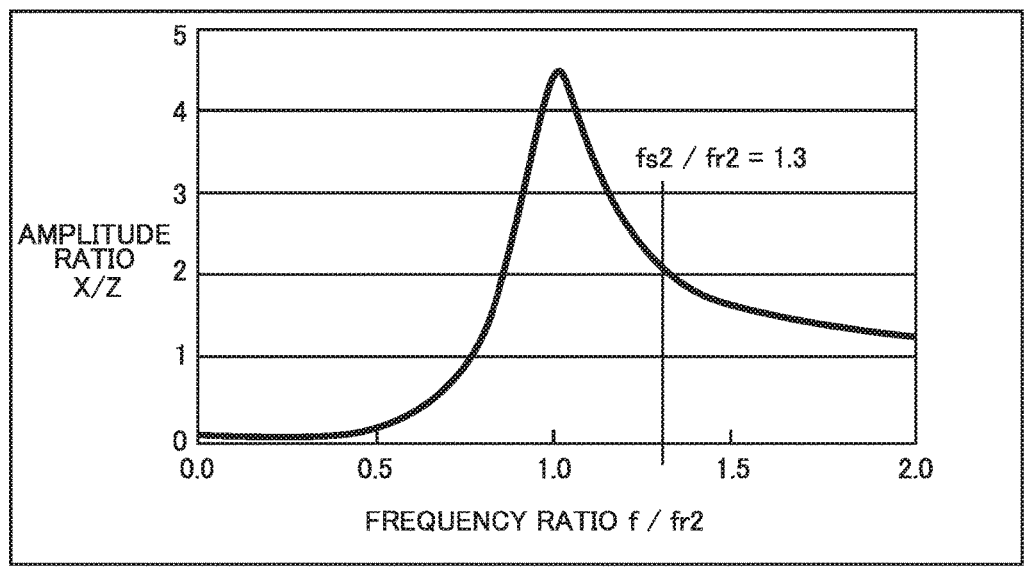
FIG. 6 is a diagram illustrating an amplitude ratio in a second direction and a first direction in an objective lens scanning mechanism of a scanning type image measuring apparatus.

FIG. 6 is a diagram illustrating a ratio of the amplitude X in the second direction to the amplitude Z in the first direction in FIGS. 5A and 5B. The horizontal axis of FIG. 6 is a ratio of the frequency to the resonance frequency fr2 in the second direction. The ratio of the amplitude X to the amplitude Z becomes the maximum near the resonance frequency fr2. The scanning frequency fs2 of the objective lens 11 in the second direction may be allowed to be coincident at the resonance frequency fr2 in the second direction as long as only the effect of increasing the amplitude is obtained. However, as illustrated in FIG. 5A, since the phase change is steep near the resonance frequency, a phase shift occurs with respect to a small error of the scanning frequency and the resonance frequency.

Therefore, in the embodiment, the scanning frequency fs2 of the objective lens 11 in the second direction is set to be higher than the resonance frequency fr2 in the second direction. By shifting the scanning frequency from the resonance frequency, it is possible to reduce the influence of the phase shift on a small error of the scanning frequency and the resonance frequency. By setting the scanning frequency fs2 in the second direction to be in the high frequency range higher than the resonance frequency fr2 in the second direction, it is possible to reduce the imaging time.

For example, in FIG. 6, in the case where the scanning frequency fs2 in the second direction is to be 1.3 times the resonance frequency fr2 in the second direction, the scanning time is reduced by 1/1.3 times the scanning time in the case of scanning at the resonance frequency fr2 in the second direction, so that it is possible to increase the amplitude in the second direction to be about twice the amplitude in the first direction.

Figure 7:
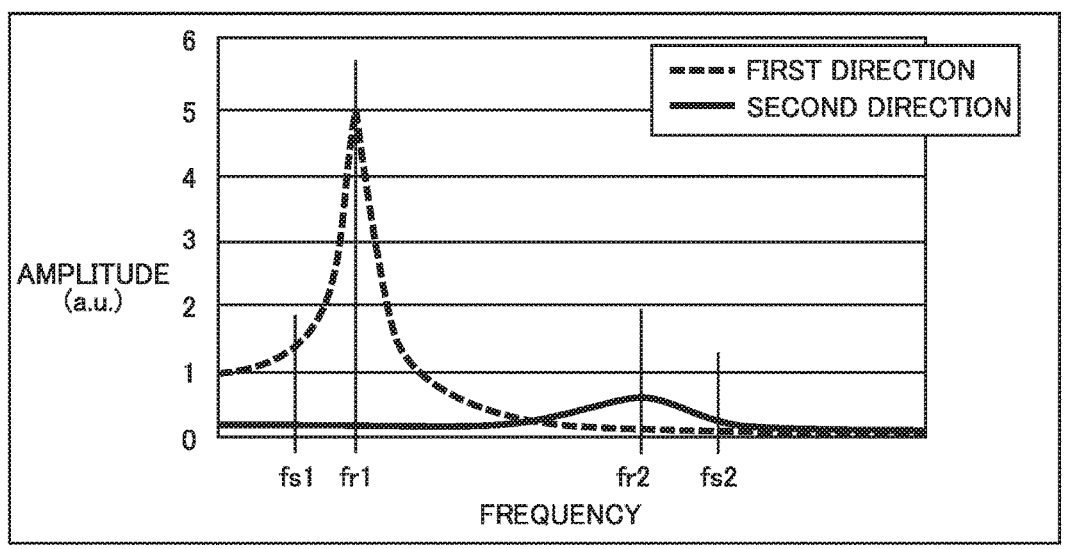
FIG. 7 is a diagram illustrating a scanning frequency in a first direction in an objective lens scanning mechanism of a scanning type image measuring apparatus.

FIG. 7 is a diagram illustrating the scanning frequency fs1 of the objective lens 11 in the first direction in the objective lens scanning mechanism 2 according to the embodiment. Since the scanning of the objective lens 11 in the first direction may be slower than the scanning in the second direction, the scanning frequency fs1 of the objective lens 11 in the first direction is set to be lower than the resonance frequency fr1 in the first direction.

In the embodiment, the cross-sectional shape of the support member 16 is a rectangle where the dimension in the second direction is larger than the dimension in the first direction, so that the spring constant in the first direction is not allowed to be unnecessarily large. Therefore, it is possible to ensure the amplitude in the low frequency range lower than the resonance frequency fr1 in the first direction, and it is possible to suppress the power consumption when scanning the objective lens 11 in the first direction.

In addition, by setting the scanning frequency fs1 of the objective lens 11 in the first direction to be lower than the resonance frequency fr1 in the first direction, the scanning frequency fs1 in the first direction can be sufficiently separated from the resonance frequency fr2 in the second direction, so that it is possible to reduce the influence on the second direction when scanning the objective lens 11 at the scanning frequency fs1 in the first direction.

In addition, although the case of scanning the objective lens 11 at the scanning frequency fs1 in the first direction is illustrated herein, there may be employed a method where, while scanning the objective lens 11 in one row in the second direction, the position in the first direction is fixed, and after the scanning in one row in the second direction, the objective lens 11 is moved by a predetermined amount in the first direction. In this case, it can be considered that the scanning frequency fs1 of the objective lens 11 in the first direction corresponds to zero frequency, and the effect of suppressing the power consumption when moving the objective lens 11 in the first direction is obtained in the same manner.

In addition, the direction in which the amount of moving the objective lens 11 is larger between the first direction and the second direction is set to be the second direction for scanning at a higher speed, so that it is possible to more effectively reduce the scanning time of the objective lens 11.

Figure 8:
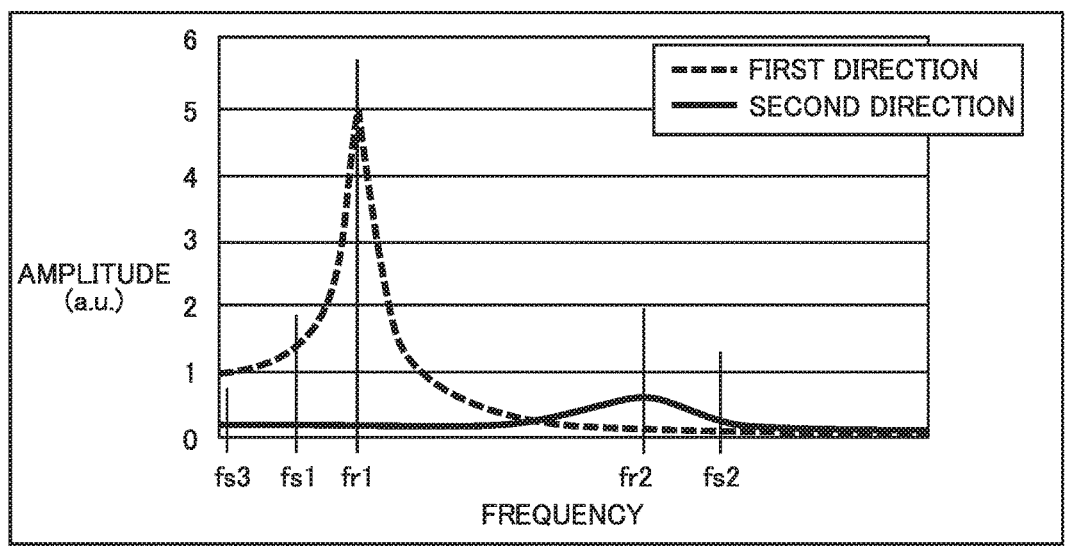
FIG. 8 is a diagram illustrating a scanning frequency in a third direction in a movement mechanism of a scanning type image measuring apparatus.

FIG. 8 is a diagram illustrating the scanning frequency fs3 of the objective lens scanning mechanism 2 in the third direction in the movement mechanism 3 according to the embodiment. Since the scanning of the objective lens scanning mechanism 2 in the third direction may be slower than the scanning of the objective lens 11 in the first direction, the scanning frequency fs3 of the objective lens scanning mechanism 2 in the third direction may be set to be lower than the scanning frequency fs1 of the objective lens 11 in the first direction.

In addition, although the case of scanning the objective lens scanning mechanism 2 at the scanning frequency fs3 in the third direction is illustrated herein, the same effect can also be obtained in the case of moving the objective lens scanning mechanism 2 by a predetermined amount by the movement mechanism 3.

As described above, according to the embodiment, the objective lens scanning mechanism 2 for operating the objective lens 11 in the first direction which is the optical axis direction thereof and the second direction perpendicular to the first direction is provided, and the resonance frequency fr2 in the second direction is set to be higher than the resonance frequency fr1 in the first direction, and the scanning frequency fs2 of the objective lens 11 in the second direction is set to be higher than the resonance frequency fr2 in the second direction, so that it is possible to realize a scanning type image measuring apparatus having low power consumption during the scanning of the objective lens and capable of reducing an imaging time.

Second Embodiment

Figure 9:
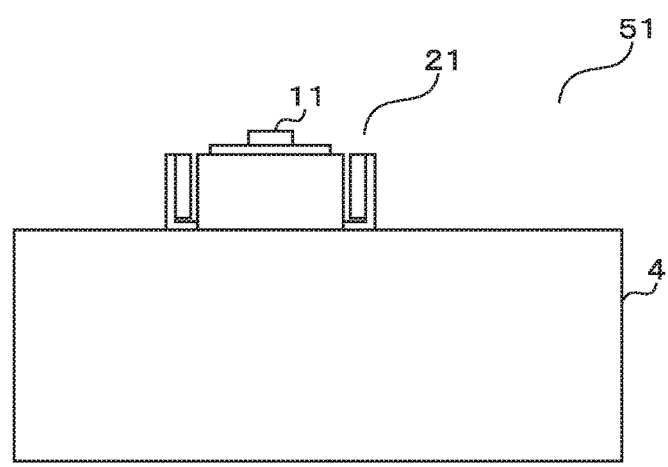
FIG. 9 is a diagram illustrating a scanning type image measuring apparatus according to a second embodiment of the invention.
Figure 9:
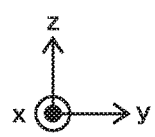

Next, a scanning type image measuring apparatus according to a second embodiment of the invention will be described. FIG. 9 is a diagram illustrating the scanning type image measuring apparatus 51 according to the embodiment. The scanning type image measuring apparatus 51 is configured to include an objective lens scanning mechanism 21 for operating the objective lens 11 for focusing light on a measurement target, and a housing 4 on which the optical system is mounted. An optical axis direction of the objective lens 11 is defined as a z direction, and two directions perpendicular to the z direction are defined as an x direction and a y direction. In addition, the z direction is defined as the first direction, the x direction is defined as the second direction, and the y direction is defined as the third direction.

The embodiment is different from the first embodiment in that the objective lens scanning mechanism 21 operates the objective lens 11 in three directions of the first, second, and third directions. Since the configuration of the optical system and the method of acquiring the image of the measurement target are the same as those in the first embodiment, the description thereof will be omitted.

Figure 10:
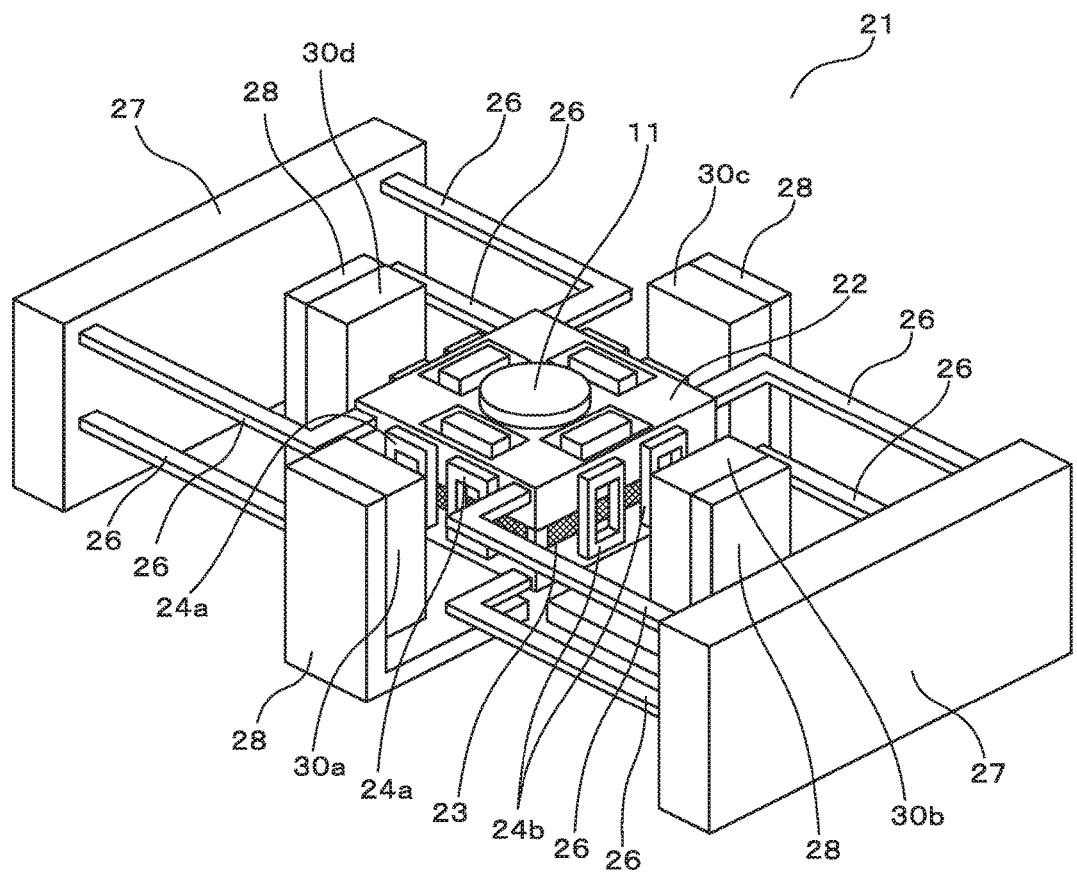
FIG. 10 is a diagram illustrating an objective lens scanning mechanism of a scanning type image measuring apparatus.
Figure 10:
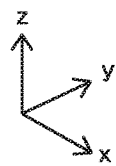
Figure 11:
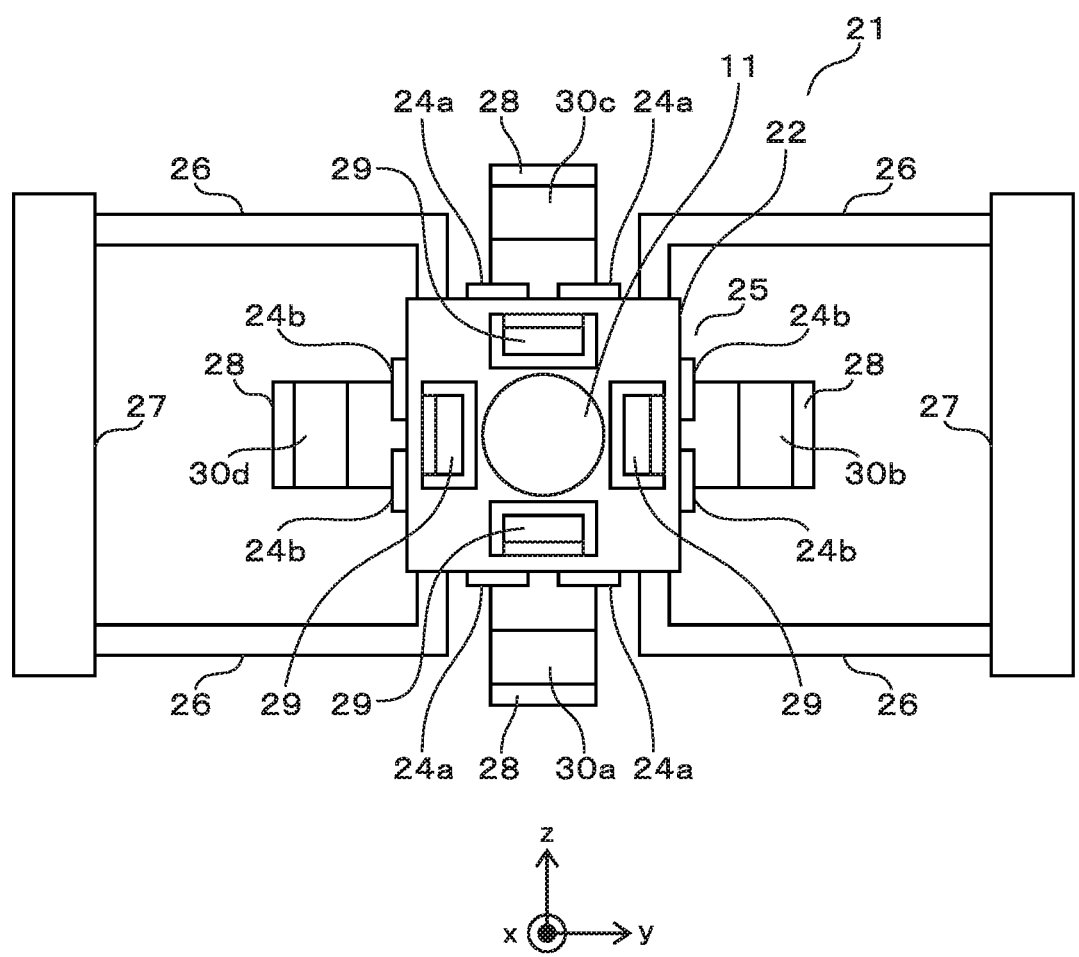
FIG. 11 is a top diagram of an objective lens scanning mechanism of a scanning type image measuring apparatus.

FIG. 10 is a diagram illustrating a configuration example of the objective lens scanning mechanism 21, and FIG. 11 is a top diagram thereof. The objective lens 11 is mounted on an upper surface of a holder 22. A first coil 23 for generating a driving force in the first direction is attached so as to circulate the side surface of the holder 22. Two second coils 24a for generating a driving force in the second direction are attached to each of two side surfaces perpendicular to the third direction of the holder 22. Two third coils 24b for generating a driving force in the third direction are attached to each of two side surfaces perpendicular to the second direction of the holder 22. The movable unit 25 is configured with the objective lens 11, the holder 22, the first coil 23, the second coils 24a, and the third coils 24b.

The movable unit 25 is supported with respect to a fixed unit 27 by a support member 26. The support member 26 is arranged in a plane parallel to the xy plane and has an L shape having portions parallel to the second direction and the third direction, and the length of the portion parallel to the second direction is larger than length of the portion parallel to the third direction. By allowing the support member 26 to have an L shape, the movable unit 25 can be displaced with respect to the fixed unit 27 in three directions of the first, second, and third directions.

The sum of the length of the portion of the support member 26 parallel to the second direction and the length of the portion parallel to the third direction affects the spring constant of the movable unit 25 in the first direction. The length of the portion of the support member 26 parallel to the third direction affects the spring constant of the movable unit 25 in the second direction. The length of the portion of the support member 26 parallel to the second direction affects the spring constant of the movable unit 25 in the third direction. In the embodiment, since the length of the portion of the support member 26 parallel to the second direction is set to be larger than the length of the portion parallel to the third direction, the spring of the support member 26 with respect to the displacement of the movable unit 25 has the smallest value in the first direction and has the largest value in the second direction, and the spring constant in the third direction is between the two values.

Magnets 30a to 30d for exerting magnetic flux density on the first coil 23, the second coil 24a, and the third coil 24b are arranged to face the four side faces of the holder 22. The magnets 30a to 30d are attached to a yoke 28. An inner yoke 29 is arranged so as to interpose the second coil 24a and the third coil 24b with respect to the magnets 30a to 30d.

In the objective lens scanning mechanism 21 configured as described above, when a current flows through the first coil 23, a driving force in the first direction is generated by electromagnetic action with the magnetic flux density from the magnets 30a to 30d, so that the movable unit 25 is operated in the first direction. In addition, when a current flows through the second coil 24a, a driving force in the second direction is generated by electromagnetic action with the magnetic flux density from the magnets 30a and 30c, so that the movable unit 25 is operated in the second direction. In addition, when a current flows through the third coil 24b, a driving force in the third direction is generated by electromagnetic action with the magnetic flux density from the magnets 30b and 30d, so that the movable unit 25 is operated in the third direction.

Figure 12:
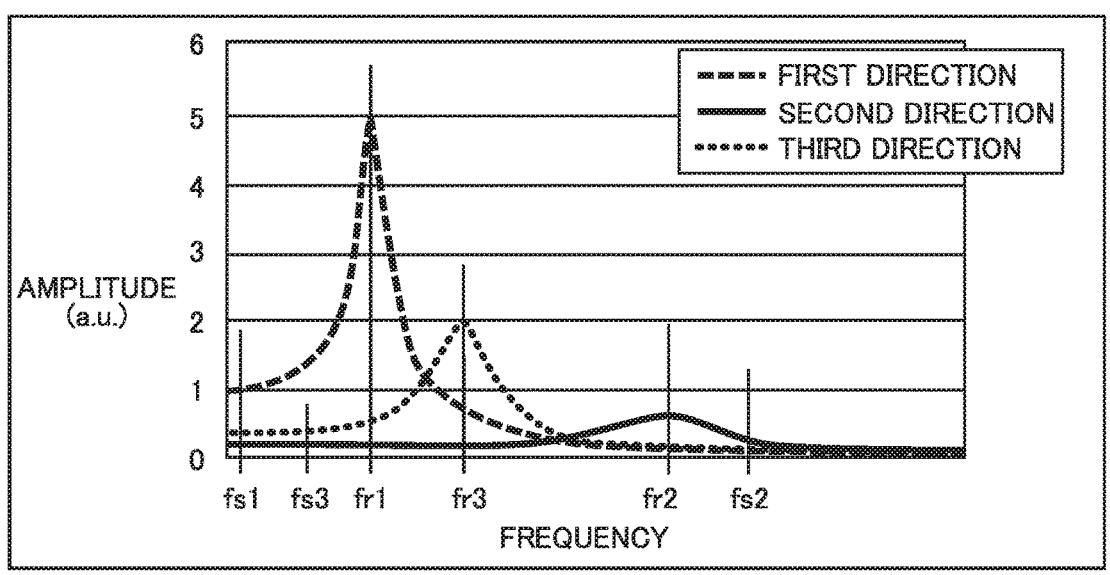
FIG. 12 is a diagram illustrating a frequency response characteristic of an objective lens scanning mechanism of a scanning type image measuring apparatus.

FIG. 12 is a diagram illustrating an example of a frequency response characteristic of the objective lens scanning mechanism 21 according to the embodiment. The frequency response characteristics of the first, second, and third directions illustrate a response to a constant current or a constant voltage.

The spring constant of the support member 26 according to the embodiment has the smallest value in the first direction, has the next smallest value in the third, and has the largest value in the second direction. Therefore, the resonance frequency related to the spring constant of the support member 26 and the mass of the movable unit 25 is set such that the resonance frequency fr1 in the first direction has the lowest value, the resonance frequency fr3 in the third direction has the next lowest value, and the resonance frequency fr2 in the second direction has the highest value.

With respect to the image of the measurement target, an image in the xy plane is acquired by scanning the objective lens 11 at the scanning frequency fs2 in the second direction and scanning the objective lens 11 at the scanning frequency fs3 in the third direction. In addition, a three-dimensional image of the measurement target is acquired by scanning the objective lens 11 at the scanning frequency fs1 in the first direction.

Herein, by setting the scanning frequency fs2 of the objective lens 11 in the second direction to be higher than the resonance frequency fr2 in the second direction, it is possible to reduce the imaging time.

Since the scanning of the objective lens 11 in the first direction and the scanning of the objective lens 11 in the third direction may be slower than the scanning in the second direction, the scanning frequency fs1 of the objective lens 11 in the first direction is set to be lower than the resonance frequency fr1 in the first direction, and the scanning frequency fs3 of the objective lens 11 in the third direction is set to be lower than the resonance frequency fr3 in the third direction. Therefore, it is possible to suppress the power consumption when scanning the objective lens 11 in the first direction and the third direction.

In addition, the scanning frequency fs1 of the objective lens 11 in the first direction can be sufficiently separated from the resonance frequency fr2 in the second direction and the resonance frequency fr3 in the third direction, so that it is possible to reduce the influence on the second direction and the third direction when scanning the objective lens 11 in the first direction.

Furthermore, the scanning frequency fs3 of the objective lens 11 in the third direction is set to be lower than the resonance frequency fr1 in the first direction, so that it is possible to reduce the influence on the first and second directions when scanning the objective lens 11 in the second direction.

In addition, the direction in which the amount of moving the objective lens 11 is largest among the first, second, and third directions is set to be the second direction for scanning at the highest speed, so that it is possible to most effectively reduce the scanning time of the objective lens 11.

As described above, according to the embodiment, the objective lens scanning mechanism 21 for operating the objective lens 11 in three directions of the first, second, and third directions is configured, so that it is unnecessary to provide the movement mechanism 3 that is used in the first embodiment, and it is possible to miniaturize the scanning type image measuring apparatus 51.

In addition, the invention is not limited to the above-described embodiments, but the invention includes various modified examples. For example, the above-described embodiments have been described in detail for the better understanding of the invention, and the invention is not necessarily limited to the mode having all the configurations described. In addition, a portion of configurations of one embodiment can be replaced with configurations of another embodiment. In addition, a configuration of another embodiment can be added to the configurations of one embodiment. In addition, with respect to a portion of the configuration of each embodiment, a configuration of another embodiment can be added, deleted, or replaced.

What is claimed is:

1. A scanning type image measuring apparatus, with an objective lens and a support member displaceably supporting the objective lens, performing image measurement by irradiating a measurement target with light while scanning the objective lens at a predetermined scanning frequency,
   wherein the objective lens is scanned in a first direction and in a second direction substantially perpendicular to the first direction and in a third direction substantially perpendicular to the first direction and the second direction,
   wherein a resonance frequency is determined by a mass of a movable unit including the objective lens and an elastic characteristic of the support member, and
   wherein the resonance frequency in the second direction is higher than the resonance frequency in the first direction and the resonance frequency in the third direction, and the scanning frequency of the objective lens in the second direction is higher than the resonance frequency in the second direction.

2. The scanning type image measuring apparatus according to claim 1, wherein the first direction is an optical axis direction of the objective lens.

3. The scanning type image measuring apparatus according to claim 1, wherein a direction in which an amount of moving the objective lens is large among the first and second directions is the second direction.

4. The scanning type image measuring apparatus according to claim 1, wherein a cross-sectional shape, of the support member supporting the movable unit including the objective lens, parallel to a plane including the first direction and the second direction, is a rectangle of which a dimension in the second direction is larger than a dimension in the first direction.

5. The scanning type image measuring apparatus according to claim 1, wherein the scanning frequency of the objective lens in the first direction is lower than the resonance frequency in the first direction.

6. The scanning type image measuring apparatus according to claim 1, wherein, while the objective lens is scanned once in the second direction, a position of the objective lens in the first direction is fixed, and after the objective lens is scanned once in the second direction, the objective lens is moved by a predetermined amount in the first direction.

7. The scanning type image measuring apparatus according to claim 1, wherein a direction in which an amount of moving the objective lens is large among the first, second, and third directions is the second direction.

8. The scanning type image measuring apparatus according to claim 1, wherein the scanning frequency of the objective lens in the first direction is lower than the resonance frequency in the first direction, and the scanning frequency of the objective lens in the third direction is lower than the resonance frequency in the third direction.

9. A scanning type image measuring method with an objective lens and a support member displaceably supporting the objective lens, performing image measurement by irradiating a measurement target with light while scanning the objective lens at a predetermined scanning frequency, comprising the steps of:
   determining a resonance frequency based on a mass of a movable object including the objective lens and an elastic characteristic of the support member, and
   performing the image measurement by scanning the objective lens in a first direction and in a second direction substantially perpendicular to the first direction and in a third direction substantially perpendicular to the first direction and the second direction,
   wherein the resonance frequency in the second direction is higher than the resonance frequency in the first direction and the resonance frequency in the third direction, and the scanning frequency of the objective lens in the second direction is higher than the resonance frequency in the second direction.

10. The scanning type image measuring method according to claim 9, wherein the first direction is an optical axis direction of the objective lens.

11. The scanning type image measuring method according to claim 9, wherein a direction in which an amount of moving the objective lens is large among the first and second directions is the second direction.

12. The scanning type image measuring method according to claim 9, wherein a cross-sectional shape, of the support member supporting the movable unit including the objective lens, parallel to a plane including the first direction and the second direction, is a rectangle of which a dimension in the second direction is larger than a dimension in the first direction.

13. The scanning type image measuring method according to claim 9, wherein the scanning frequency of the objective lens in the first direction is lower than the resonance frequency in the first direction.

14. The scanning type image measuring method according to claim 9, wherein, while the objective lens is scanned once in the second direction, a position of the objective lens in the first direction is fixed, and after the objective lens is scanned once in the second direction, the objective lens is moved by a predetermined amount in the first direction.

15. The scanning type image measuring method according to claim 9, wherein a direction in which an amount of moving the objective lens is large among the first, second, and third directions is the second direction.

16. The scanning type image measuring method according to claim 9, wherein the scanning frequency of the objective lens in the first direction is lower than the resonance frequency in the first direction, and the scanning frequency of the objective lens in the third direction is lower than the resonance frequency in the third direction.

* * * * *